United States Patent
Schulze

[15] 3,701,912
[45] Oct. 31, 1972

[54] FAN MOTOR BEARING ASSEMBLY

[72] Inventor: Gerhard Schulze, Eichendorffweg 18, D-8021 Hohenschaeftlarn, Germany

[22] Filed: Nov. 8, 1971

[21] Appl. No.: 196,424

[52] U.S. Cl. .................................. 310/90, 308/70
[51] Int. Cl. ............................................ H02k 5/16
[58] Field of Search........310/90, 62, 63; 308/DIG. 1, 308/9, 70, 71

[56] References Cited

UNITED STATES PATENTS

| | | | |
|---|---|---|---|
| 3,319,098 | 5/1967 | Hartman | 310/90 |
| 3,195,466 | 7/1965 | Young | 310/90 |
| 3,644,066 | 2/1972 | Heob | 310/90 |
| 2,904,709 | 9/1959 | Lautner | 310/90 |

*Primary Examiner*—J. D. Miller
*Assistant Examiner*—R. Skudy
*Attorney*—Frederick M. Arbuckle

[57] ABSTRACT

A bearing assembly for mounting a fan motor rotor on a stationary cantilever shaft; the bearing assembly includes a rotor bearing member encompassing the shaft and having two oppositely facing bearing surfaces of conical or spherical configuration. A first stator bearing member, affixed to the shaft, engages one rotor bearing surface. A floating stator bearing member engages the other rotor bearing surface. The stator bearing members have bearing surfaces complementary to the rotor bearing surfaces, and at least one surface of each mating pair constitutes a self-lubricating surface. A resilient cup or other simple resilient biasing means, connected to the floating stator bearing member, biases the assembly to maintain both sets of bearing surfaces in continuous engagement regardless of changes and imbalance in axial thrust, bearing wear, and thermal expansion; the biasing means also restrains the floating bearing member against rotation.

8 Claims, 5 Drawing Figures

Inventor
Gerhard Schulze

Attorney

Inventor
Gerhard Schulze

Attorney

FAN MOTOR BEARING ASSEMBLY

BACKGROUND OF THE INVENTION

There are numerous applications for fans of various sizes, particularly small fans, that require continuous or virtually continuous service at high efficiency and with minimal noise. Nevertheless, in many such applications, the cost of the fan may be a substantial factor. A particularly vulnerable portion of almost any fan, from the standpoint of wear, is the bearing assembly that supports the fan rotor; the same bearings often present a substantial problem in maintenance of a minimum noise level.

Oil-impregnated powdered metal bearings, usually formed of phosphor bronze, have been commonly used in fan applications. The durability of these bearings, however, has not been satisfactory in many instances, primarily as the result of changes in the oil characteristics and the limited volume of oil available for lubrication purposes. Refilling of the oil in bearings of this kind is quite complicated, and may be virtually impossible. Restoration of the lubrication characteristics in worn bearings of this type is quite impractical for most fans, particularly from an economic standpoint.

A reduction in initial cost of the bearing structures for many fans, particularly smaller fans, can be accomplished by utilizing plastic bearings with lubricating additives, such as molybdenum disulfide, to afford lubrication at the bearing surfaces. However, the differences in thermal coefficients of expansion between the metal parts of a fan rotor and stator, comprising the motor for the fan, and the plastic bearings, introduce "play" or "wobble" into bearings of conventional configuration. The result is often excessive noise and undesirable wear from unbalanced inertial forces. The problem can be alleviated somewhat by filling the bearing gaps with lubricant, but this does not present a permanent solution to the problem. A more effective solution from a technical standpoint is the use of ball bearings, but this introduces undesirable costs. Moreover, ball bearings are not always as quiet as desired.

One other proposal for bearing assemblies for small electrical motors, including fan motors, entails the use of self-aligning conical bearings, maintained in engagement by a spring or other similar continuous alignment device. A bearing assembly of this general kind is described in Hartman U.S. Pat. No. 3,319,098. But the proposed constructions for self-aligning conical bearings, as suggested in the art, have entailed relatively large numbers of parts and a combination of thrust and sleeve bearing surfaces leading to relatively high cost and questionable wear characteristics.

SUMMARY OF THE INVENTION

It is a principal object of the invention, therefore, to provide a new and improved self-aligning bearing assembly for use in a fan or in similar applications that affords a long operational life with little or no maintenance and that holds bearing noise to a minimum.

A specific object of the invention is to provide a new and improved self-cleaning and self-aligning bearing assembly for an electrical fan that entails a minimum number of parts and that requires a minimum amount of space, affording a reduction in both initial and subsequent costs.

Another object of the invention is to provide a new and improved self-lubricating and self-aligning bearing assembly for an electrical fan that inherently minimizes "wobble" or "play" of the rotating part of the fan.

A specific object of the invention is to provide a new and improved bearing assembly for an electrical fan that requires only a single resilient rubber cup, or a simple spring and an O-ring, to maintain the bearing in continuous alignment, with zero end play, and to limit rotation of bearing members to those members having self-lubricating bearing surfaces.

Accordingly, the invention relates to a bearing assembly for a fan or like appliance of the kind comprising a stator mounted on a stationary support structure and concentric with a given axis, a fixed shaft mounted on the support structure in coaxial relation to the stator, a rotor positioned in coaxial relation to the stator, one encompassing the other, the rotor having a central bore encompassing the shaft, and a working load coupled in axial thrust-producing relation to the rotor. The bearing assembly of the invention comprises a rotor bearing member mounted within the rotor bore and affixed to the rotor, the rotor bearing member having an axial opening larger than the shaft, through which the shaft projects, and the rotor bearing member affording two oppositely facing rotor bearing surfaces each constituting a regular surface of rotation defined by rotation of an inclined line about the aforesaid axis. Preferably, conical surfaces are utilized, but spherical and other like shapes can be employed. A fixed stator bearing member is affixed to one end of the shaft and has a bearing surface engaging one of the rotor bearing surfaces. A floating stator bearing member, having an axial opening larger than the shaft, is positioned on the shaft and has a bearing surface engaging the other rotor bearing surface. The bearing surfaces of the stator bearing members are complementary in configuration to the respective rotor bearing surfaces that they engage, and at least one bearing surface of each mating pair comprises a self-lubricating surface. The bearing assembly further comprises resilient biasing means, extending between the support structure and the floating stator bearing member, for biasing the floating stator bearing member toward its associated rotor bearing surface in an axial direction corresponding to the direction of thrust from the working load to maintain both stator bearing surfaces in engagement with the rotor bearing surfaces and thereby maintain the rotor and stator in accurate concentric alignment despite changes in axial thrust, wear on the bearing surfaces, and thermal expansion. The biasing means, which may comprise a single cup-shaped member of silicon rubber or other suitable elastomer, or may include an O-ring interposed between the shaft and the floating stator bearing member plus a metal spring from the support structure to the floating stator bearing member, is anchored to the support structure and to the floating stator bearing member to restrain the floating stator bearing against rotation.

DESCRIPTION OF THE PREFERRED EMBODIMENTS

Figure 1:
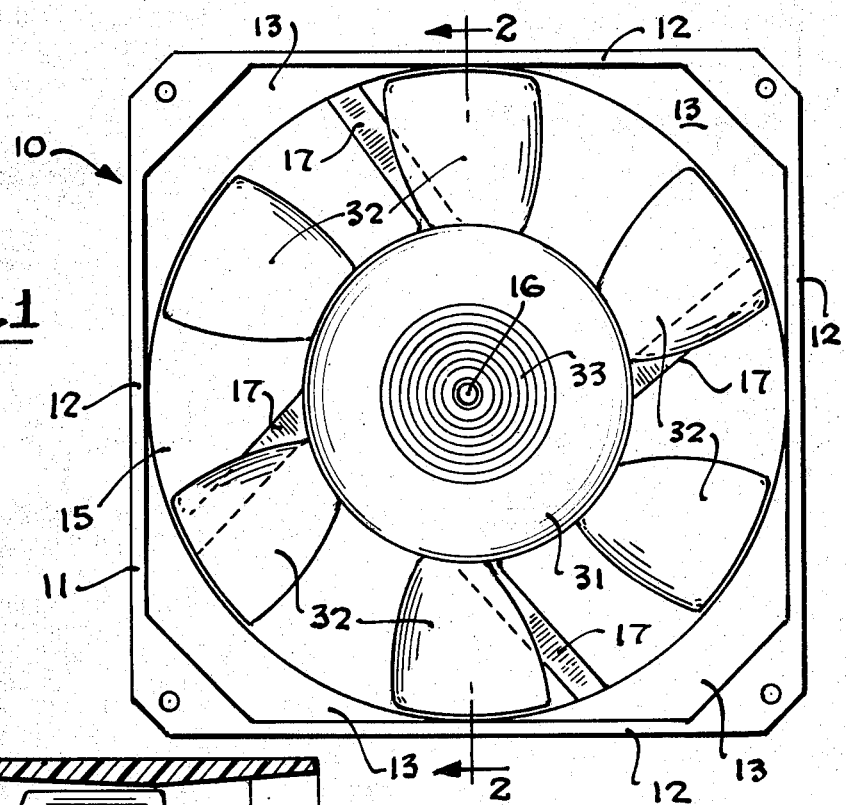
FIG. 1 is a front elevation of a small electrical fan that may incorporate a bearing assembly constructed in accordance with the present invention.
Figure 2:
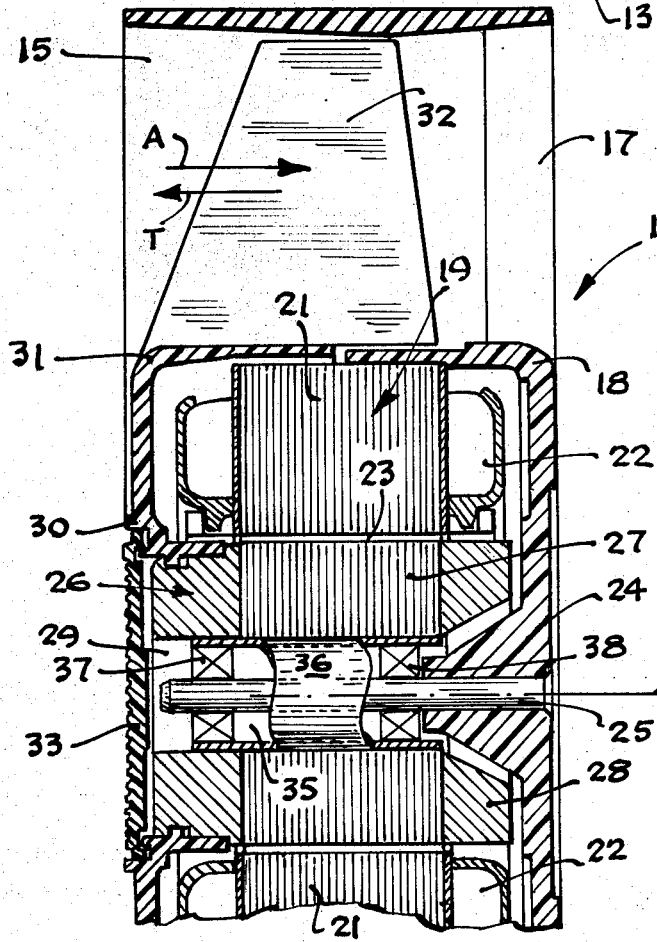
FIG. 2 is a cross-section view of the fan taken approximately along line 2—2 in FIG. 1.

FIGS. 1 and 2 illustrate a small electrical fan 10, of the type frequently referred to as a "pancake" fan, in which a bearing assembly constructed in accordance with the present invention may be employed advantageously. Fan 10 comprises a frame 11 including outer walls 12 of generally rectangular configuration; a circular configuration could also be employed. The corners of frame 11 are provided with baffles 13 so that the frame defines a circular air space 15 that is concentric about a fan axis 16.

Frame 11 further includes a series of inwardly extending spokes 17 that terminate in a central support structure comprising a stator housing 18 (FIG. 2). Frame 11, including walls 12, baffles 13, spokes 17, and housing 18 may be formed as an integral molded member of an appropriate plastic material or of metal. A stator 19 for a conventional electrical motor is mounted in housing 18; as shown in FIG. 2, stator 19 comprises a plurality of electrical steel laminations 21 encompassed by electrical coils 22. Stator 19 has a central opening 23 that is concentric with the fan axis 16.

At one side of fan 10, the stationary support structure that includes the motor housing 18 affords a central hub 24 in which a stationary cantilever shaft 25 is mounted. Shaft 25 is formed of steel and may be press fit into a central bore in the housing hub 24. If desired, other mounting means affording a stable and stationary support for shaft 25 may be utilized. Shaft 25 projects through the central stator opening 23 and is coaxial with the fan axis 16.

An electrical motor rotor 26 is positioned within the central stator opening 23, being rotatably mounted upon the stationary shaft 25 by a bearing assembly constructed in accordance with the present invention, as described more fully hereinafter. Rotor 26 comprises a multiplicity of annular electrical steel laminations 27, preferably cast into or otherwise fixedly mounted in an aluminum rotor mounting structure 28. Other mounting arrangements for the laminations 27 of rotor 26 may be employed, but a die cast rotor construction is usually preferred. Rotor 26 has a central bore 29 that is coaxial with the fan axis 16, the rotor being disposed in encompassing relation to shaft 25. An impeller hub 30 is affixed to rotor 26 for rotation therewith; the impeller hub extends radially from rotor 26 and back into the open peripheral air space 15 of the fan, supporting a series of fan blades 32 projecting radially across space 15. The fan blade assembly 31, comprising hub 30 and blades 32, may also include a central face plate or escutcheon 33 constituting a dust cover for shaft 25 and the bearing assembly that supports rotor 26. The fan blade assembly is formed of molded plastic, though a metal assembly could be employed.

Fan 10 comprises a bearing assembly 35 for mounting rotor 26 on shaft 25 in alignment with stator 19. Bearing assembly 35, in the illustrated construction, includes a sleeve 36 affixed to rotor 26 within the rotor bore 29. Bearing assembly 36 further comprises a pair of bearings 37 and 38, illustrated only generally in FIG. 2, that support sleeve 36 and rotor 26 for rotation about shaft 16 and that also serve to take up axial thrust during operation of the fan. In previously known fan structures, ball bearings have been utilized for bearings 37 and 38; a substantially different bearing construction is employed in the bearing assembly 35 as described hereinafter in connection with FIGS. 3–5.

The overall operation of the fan 10 illustrated in FIGS. 1 and 2 is quite conventional. Coils 22 are connected to a suitable electrical power supply, thus energizing the motor comprising stator 19 and rotor 26, so that rotor 26 rotates about the fixed shaft 25. The fan assembly 31 on rotor 26, which is the working load for fan 10, rotates conjointly with rotor 26, and blades 32 impel air through the annular air space 15 defined by frame 11. The direction of air movement is dependent upon the inclination of fan blades 32 and may be assumed to be in the direction of arrow a (FIG. 2), producing a reactance thrust on the rotor in the direction of the arrow T. The working load, fan assembly 31, also tends to produce "wobble" or "play" in the operation of rotor 26, depending on the degree of imbalance or eccentricity in the blades 32 and other like factors.

Figure 3:
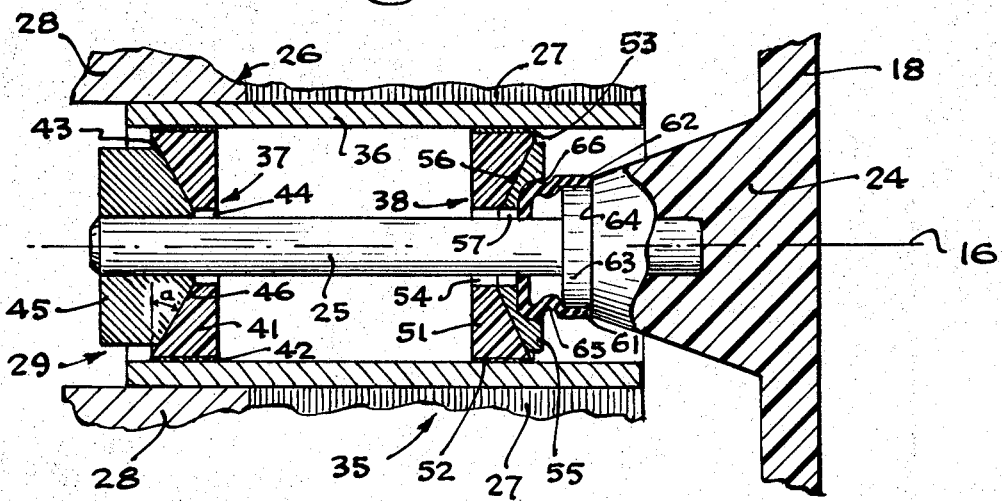
FIG. 3 is a detail sectional view, drawn to an enlarged scale, of one embodiment of a bearing assembly constructed in accordance with the present invention.

FIG. 3 affords a detailed illustration of the bearing assembly 35 as constructed in accordance with one embodiment of the present invention. As shown in FIG. 3, the front or outer bearing 37 of bearing assembly 35 comprises a rotor bearing element 41 that is fixedly mounted within the rotor bore 29, in sleeve 36. The rotor bearing element 41 may be formed of a hard, durable plastic having a lubricant integrally incorporated therein, such as that available commercially under the trade name "Molygliss;" or may be fabricated from plastic coated metal if desired. The rotor bearing element 41 can be press fit into sleeve 36 or may be affixed to the sleeve by a suitable adhesive such as an epoxy resin bond 42. Bearing element 41 has an outwardly facing rotor bearing surface 43 that constitutes a regular surface of rotation defined by rotation of an inclined line about axis 16. More specifically, the rotor bearing surface 43 is a conical surface with the axis of the cone constituting fan axis 16. Bearing element 41 has an axial opening 44 that is substantially larger than shaft 15 and hence does not engage the shaft.

Bearing 37 further comprises a stator bearing member 45 affixed to the free end of the cantilever shaft 25. The fixed stator bearing member 45 is preferably formed of hardened steel and may be press fit or otherwise suitably mounted in fixed, non-rotatable position on the end of shaft 25. Bearing member 45 has a conical bearing surface 46 that is complementary in configuration to and that engages the conical bearing surface 43 of rotor bearing element 41.

The other bearing 38 of bearing assembly 35 includes a second rotor bearing element 51 that corresponds in construction to rotor bearing element 41 and that affords an outwardly facing conical bearing surface 53. The second rotor bearing element 51, like bearing element 41, may be press fit into sleeve 36 or, as shown in FIG. 3, may be bonded to the interior of sleeve 36 by an epoxy resin or any other appropriate adhesive layer 52. The bearing surface 53 of rotor bearing element 51 is preferably formed of a hard, durable, lubricant-impregnated plastic or is otherwise appropriately treated to provide a substantially self-lubricating bearing surface. Bearing element 51, like element 41, has an axial opening 54 that is substantially larger than shaft 25. Both of the rotor bearing elements 41 and 51 may be mounted directly to the rotor mounting structure 28, eliminating sleeve 36, if desired.

Bearing 38 further comprises a stator bearing member 55 that is preferably formed from hardened steel. Stator bearing member 55 has a conical bearing surface 56 that is complementary in configuration to and that engages surface 53 of rotor bearing element 51. Unlike stator bearing member 45, however, bearing member 55 is not affixed to shaft 25. Instead, bearing member 55 is provided with an enlarged axial opening 57, so that it fits loosely around shaft 25, affording a "-floating" bearing member.

Bearing assembly 35 further includes resilient biasing means for biasing the floating stator bearing member 55 in an axial direction toward bearing surface 53 of rotor bearing element 51 to maintain the bearing surfaces 53 and 56 in continuous engagement and also to maintain the bearing surfaces 43 and 46 in engagement. In the embodiment of FIG. 3, the resilient biasing means comprises a cup-shaped biasing member 61, preferably formed of silicon rubber or of another appropriate elastomer capable of maintaining its elastic properties over a long period of time during which it may be subjected to substantial changes in temperature, humidity, and other environmental factors.

The cup-shaped biasing member 61 includes a sleeve portion 62 that is mounted upon a rim 63 on the hub 24 of the stationary support structure comprising the stator housing 18. (see FIG. 2). Sleeve 62 engages a shoulder 64 that limits movement of biasing member 61 outwardly of bearing assembly 35 (FIG. 3). The mounting of sleeve 62 on rim 63 should prevent rotation of the sleeve about the rim; an epoxy resin bond or other appropriate means may be employed for this purpose. Biasing member 61 has a re-entrant portion 65 to assure adequate and consistent resiliency of the biasing member in an axial direction. The base of the cup-shaped biasing member 61 is tightly fitted into a recess 66 in the outer surface of stator bearing member 55 and also fits tightly against shaft 25, so that stator bearing member 55 is restrained against rotational movement during operation of the fan. It may be desirable to employ an adhesive bond between biasing member 65 and stator bearing member 55 to provide more positive protection against rotational movement of the stator bearing member.

In operation of bearing assembly 35 of FIG. 3, the two rotor bearing elements 41 and 51, being fixedly mounted within sleeve 36, or directly in rotor mounting member 28 function as the equivalent of a single integral bearing member. The mating of the two sets of conical bearing surfaces 43, 46 and 53, 56 effectively and accurately centers sleeve 36, and hence rotor 26, with respect to the fan axis 16 and the shaft 25. When the fan motor is energized, and rotor 26 rotates, the only bearing surfaces are the aforementioned pairs 43,46 and 53,56 which are maintained in continuous engagement by the axial biasing force applied to the floating stator bearing member 55 by the resilient biasing member 61.

Any thermal expansion by the components of bearing assembly 35 is effectively compensated by the resilient biasing member 61. With continued use, any wear occurring at the bearing surface interfaces is also effectively compensated by the biasing force supplied by biasing member 61. At the same time, any minor imbalance of the working load 31 of the fan, or of the rotor itself, is minimized by the biasing member 61 and its interaction with the bearing structure. Consequently, the components of bearing assembly 35 are continuously maintained in accurate and consistent alignment with little or no tendency toward localized wear or other effects that could reduce the life of the bearing assembly or increase the noise that it produces when the fan is operational. Thus, bearing assembly 35 affords a long life at a low noise level, even though no supplemental lubrication is supplied. Because the biasing force exerted by biasing member 61 is in the same direction as the thrust applied to the rotor by the working load, fan assembly 31, the biasing member is relieved rather than stressed by the working thrust, assuring a long life for the biasing member.

The bearing assembly 35 incorporates a minimum number of parts and can be manufactured at a substantially lower price than previously known bearing arrangements. The overall size of the bearing assembly can be held to a minimum; in particular, the overall diameter of the bearing assembly can be made substantially smaller than equivalent ball bearing structures. Bearing assembly 35 continuously maintains rotor 26 in accurate centered relation with respect to shaft 25 and axis 16. Moreover, the bearing assembly is inherently self-cleaning because no end play is permitted by the bearing structure.

In the construction of bearing assembly 35, conical surfaces are preferred for the bearing surfaces 43, 46 and 53, 56 because they are relatively easy to manufacture to close tolerances. When conical bearing surfaces are employed, the cone angle should be selected to avoid any tendency of the bearing surfaces to lock up against each other. To this end, the cone angle $a$ should be made equal to or smaller than the friction angle of the bearing surfaces. That is, the tangent of the cone angle $a$ should be made smaller than the coefficient of friction between the bearing surfaces. Depending upon the size of the fan, the angle $a$ is preferably in the range of 10° to 25°.

Figure 4:
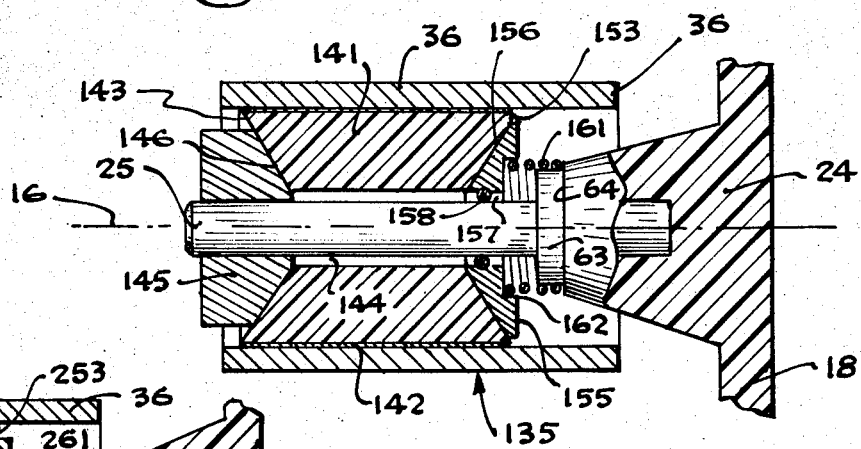
FIG. 4 is a detail sectional view, similar to FIG. 3, of a bearing assembly constructed in accordance with another embodiment of this invention.

FIG. 4 illustrates a bearing assembly 135 constituting another embodiment of the present invention, one which is substantially shorter, in an axial direction, than assembly 35. Bearing assembly 135 comprises a rotor bearing member 141 of unitary construction, preferably fabricated from a hard durable plastic, that is fixedly mounted in the interior of sleeve 36 (or directly in rotor support 28) in the rotor of the fan. An epoxy resin bond 142 may be utilized to mount the rotor bearing member 141; alternatively, a press fit or other fixed mounting means may be employed.

The rotor bearing member 141 has two rotor bearing surfaces 143 and 153 facing outwardly of the opposite ends of the bearing member. Each of the rotor bearing surfaces 143 and 153 constitutes a regular surface of rotation; more specifically, the surfaces 143 and 153 are conical surfaces with the axis of the cone constituting the fan axis 16. Surfaces 143 and 153 may be coated with molybdenum disulfide or otherwise treated to afford self-lubricating bearing surfaces. Preferably, both rotor bearing members 141 and 151 are formed of a hard, durable plastic treated to afford self-lubricating properties. Bearing member 141 has a central axial opening 144 that is somewhat larger than the fixed cantilever shaft 25, so that the rotor bearing member 141 and the shaft 25 do not contact each other.

A fixed stator bearing member 145, preferably fabricated from hardened steel, is incorporated in bearing assembly 135. Stator bearing member 145 is press fit or otherwise fixedly mounted on the free end of the cantilever shaft 25 and has a conical bearing surface 146 that engages the conical bearing surface 143 of rotor bearing member 141.

Near the fixed end of shaft 25, a floating stator bearing member 155 is incorporated in bearing assembly 135. Bearing member 155 is preferably formed of hardened steel and has a conical bearing surface 156 that engages the bearing surface 153 of rotor bearing member 141. The floating bearing member 155 has an internal axial opening 157 that is somewhat larger than shaft 25 and preferably is provided with an O-ring seal 158 to prevent accumulation of dust and other foreign material in the interior of the bearing assembly and to aid in aligning the bearing member 155 on the shaft 25.

Bearing assembly 135 incorporates resilient biasing means, between the stationary support structure boss 24 and the floating stator bearing member 155, for biasing that bearing member in an axial direction toward the associated rotor bearing surface 153 to maintain both sets of bearing surfaces 143, 146 and 153, 156 in firm and consistent engagement. This resilient biasing means comprises a coil spring 161 mounted upon the rim 63 of the hub 24 that is a part of the stator housing 18. One end of spring 161 engages the shoulder 64 on hub 24. The other end of spring 161 fits tightly into a recess 162 in the outwardly facing surface of the floating stator bearing member 155. A press fit can be utilized between members 155 and 161; alternatively, other interlocking structural arrangements can be employed to preclude rotation of either spring 161 or bearing member 155 with respect to the stationary support element 24 or the shaft 25.

It is thus seen that the bearing assembly 135 of FIG. 4 affords the same essential operational characteristics, and attendant advantages, described above with respect to assembly 35. It will be understood that an assembly 135 can be shortened even more, in an axial direction, by use of a shorter rotor bearing member, without material sacrifice of any of the structural and operational advantages of the bearing assembly.

Figure 5:
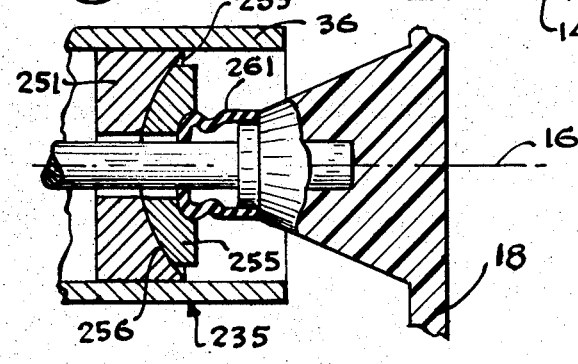
FIG. 5 is a detail sectional view illustrating yet another embodiment of the invention.

FIG. 5 illustrates yet another embodiment of the invention, comprising a bearing assembly 235. Only the righthand end of bearing assembly 235 is illustrated. The bearing assembly comprises the rotor sleeve 36, a rotor bearing element 251, a floating stator bearing member 255, and a cup-shaped elastomer biasing member 261. In bearing assembly 235, the rotor bearing element 251 has a bearing surface 253 that constitutes a segment of a sphere, and hence again constitutes a regular surface of rotation defined by rotation of an inclined line about the fan axis 16, with the rotated line constituting an arcuate segment. The mating bearing surface 256 of the floating stator bearing member 255 is of corresponding spherical configuration. In all other respects, the construction shown in FIG. 5 is essentially similar to that illustrated in FIG. 3, so that bearing assembly 235 affords all of the structural and operational advantages of the previously described embodiments.

In the preferred embodiments of the present invention, as noted above, the pitch of the fan blades is correlated with the rotational direction of the rotor and the position of the floating stator bearing member so that in the operation of the fan the axial thrust upon the rotor, resulting from the movement of air, acts only on the outer rotor bearing 37. The floating bearing and the resilient biasing means is required only to take up any unbalanced torque or thrust resulting from unequally acting air pressure on the fan blades. This relationship minimizes the force which the resilient biasing means incorporated in the floating bearing must provide in order to ensure effective engagement of the two surfaces of the floating bearing. If the fan blade assembly is modified to drive air in the opposite direction, or if the direction of rotation is reversed, producing a thrust in the opposite direction, the location of the floating stator bearing and its resilient biasing means should be changed accordingly.

In each of the foregoing embodiments of the invention, the rotor of the fan is located within a central opening in the stator. As will be readily apparent to those familiar with the art, this relationship can be and often is inverted. The bearing assembly of the invention can be utilized to equal advantage in such an inverted motor arrangement, maintaining full bearing contact for all fan speeds and resulting thrust conditions and compensating for the same factors as in the illustrated constructions.

I claim:

1. In a fan or like appliance of the kind comprising a stator mounted on a stationary support structure and concentric with a given axis, a fixed shaft mounted on the support structure in coaxial relation to the stator, a rotor positioned in coaxial relation to the stator, one encompassing the other, said rotor having a central bore encompassing said shaft, and a working load coupled in axial thrust-producing relation to the rotor, a bearing assembly for mounting the rotor on the shaft, comprising:

a rotor bearing member mounted within said rotor bore and affixed to said rotor, said rotor bearing member having an axial opening larger than said shaft, through which said shaft projects, said rotor bearing member affording two oppositely facing rotor bearing surfaces each constituting a regular surface of rotation defined by rotation of an inclined line about said axis;

a fixed stator bearing member, affixed to one end of said shaft and having a bearing surface engaging one of said rotor bearing surfaces;

a floating stator bearing member, having an axial opening larger than said shaft, and having a bearing surface engaging the other rotor bearing surface;

said bearing surfaces of said stator bearing members being complementary in configuration to the respective rotor bearing surfaces that they engage and at least one bearing surface of each mating pair comprising a self-lubricating surface;

and resilient biasing means, extending between said support structure and said floating stator bearing member, for biasing said floating stator bearing member toward its associated rotor bearing surface in an axial direction corresponding to the direction of thrust from said working load to maintain both said stator bearing surfaces in engagement with said rotor bearing surfaces and thereby maintain said rotor and stator in accurate concentric alignment despite changes and imbalance in axial thrust, wear on the bearing surfaces, and thermal expansion;

said biasing means being anchored to said support structure and to said floating stator bearing member to restrain said floating stator bearing against rotation.

2. A bearing assembly for a fan or like appliance, according to claim 1, in which each of said bearing surfaces is a conical surface, the axis of the cone being coincident with said axis.

3. A bearing assembly for a fan or like appliance, according to claim 2, in which the tangent of the cone angle, for said bearing surfaces, is less than the coefficient of friction between said surfaces.

4. A bearing assembly for a fan or like appliance, according to claim 1, in which said resilient biasing means comprises a cup-shaped resilient biasing member of elastomer material having its open end anchored to said stationary support structure, having an aperture in its base encompassing said shaft, and having its base anchored to said floating stator bearing member.

5. A bearing assembly for a fan or like appliance, according to claim 4, said resilient biasing member further having a re-entrant portion intermediate its open end and its base.

6. A bearing assembly for a fan or like appliance, according to claim 4, in which said resilient biasing member is formed of silicon rubber.

7. A bearing assembly for a fan or like appliance, according to claim 1, in which said resilient biasing means comprises a coil spring, coaxial with said shaft, anchored at one end to said stationary support structure and at the other end to said floating stator bearing member.

8. A bearing assembly for a fan or like appliance, according to claim 7, in which said resilient biasing means further comprises an O-ring seal mounted in said axial opening in said floating stator bearing member, between said floating stator bearing member and said shaft.

* * * * *